(12) United States Patent
Baek et al.

(10) Patent No.: US 7,928,881 B1
(45) Date of Patent: Apr. 19, 2011

(54) DIRECT DIGITAL FREQUENCY SYNTHESIZER USING VARIABLE SINE WAVE-WEIGHTED DIGITAL TO ANALOG CONVERTER AND SYNTHESIZING METHOD THEREOF

(75) Inventors: Kwang-Hyun Baek, Seoul (KR); Hong Chang Yeoh, Seoul (KR); Jae-Hun Jung, Seoul (KR); Yun-Hwan Jung, Seoul (KR); Joon Hyun Baek, Gyeonggi-do (KR)

(73) Assignees: Chung-Ang University Industry—Academy Cooperation Foundation, Seoul (KR); ZARAMTECHNOLOGY Co. Ltd., Gyeonggi-do (KR)

( * ) Notice: Subject to any disclaimer, the term of this patent is extended or adjusted under 35 U.S.C. 154(b) by 0 days.

(21) Appl. No.: 12/647,516

(22) Filed: Dec. 27, 2009

(30) Foreign Application Priority Data

Dec. 2, 2009 (KR) .......................... 10-2009-0118292

(51) Int. Cl.
*H03M 1/66* (2006.01)
(52) U.S. Cl. ........ 341/145; 341/144; 708/270; 708/271; 708/273; 708/276; 327/105; 327/107; 327/106
(58) Field of Classification Search .................. 341/144, 341/145; 708/270–276; 327/105–107
See application file for complete search history.

(56) References Cited

U.S. PATENT DOCUMENTS

| | | | | |
|---|---|---|---|---|
| 4,901,265 A | * | 2/1990 | Kerr et al. ..................... | 708/276 |
| 5,073,869 A | * | 12/1991 | Bjerede ......................... | 708/271 |
| 5,459,680 A | * | 10/1995 | Zimmerman et al. ......... | 708/276 |
| 5,644,602 A | * | 7/1997 | Critchlow et al. ............ | 375/308 |
| 5,748,043 A | * | 5/1998 | Koslov ........................... | 331/1 A |
| 5,986,483 A | * | 11/1999 | Yu et al. ........................ | 327/107 |
| 5,999,581 A | * | 12/1999 | Bellaouar et al. ............. | 375/377 |
| 6,118,836 A | * | 9/2000 | Dove et al. ..................... | 375/376 |
| 6,333,649 B1 | * | 12/2001 | Dick et al. ..................... | 327/105 |
| 6,587,862 B1 | * | 7/2003 | Henderson ..................... | 708/276 |
| 6,765,445 B2 | * | 7/2004 | Perrott et al. .................... | 331/17 |
| 7,437,391 B2 | * | 10/2008 | Miller ............................ | 708/276 |
| 2007/0174371 A1 | * | 7/2007 | Merlo et al. .................... | 708/200 |

* cited by examiner

*Primary Examiner* — Linh V Nguyen
(74) *Attorney, Agent, or Firm* — John L. DeAngelis; Beusse Wolter Sanks Mora & Maire, P.A.

(57) ABSTRACT

The present invention relates to a direct digital frequency synthesizer using a variable sine wave-weighted digital to analog converter with improved size and efficiency and a synthesizing method thereof. The direct digital frequency synthesizer and the synthesizing method thereof are capable of simplifying a configuration for matching output data of a phase accumulator to sine wave amplitude without increase in complexity of a DAC by applying a nonlinear DAC for directly generating a current corresponding to base points with sine weights and a variable sine wave-weighted DAC for generating fine currents to be combined with variable weights based on the base points. Accordingly, it is possible to provide a high quality output, reduce a size and power consumption, and increase a speed.

18 Claims, 11 Drawing Sheets

Q1 | Q2 | Q3 | Q4

A
B
Fine Segment
Coarse Segment

FIG.9

| SEGMENT | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 2 | 1 | 1 | 1 | 1 | 1 | 1 | 1 | 1 | 1 | 1 | 1 | 1 | 1 | 1 | 1 |
| 3 | 1 | 1 | 1 | 1 | 1 | 1 | 1 | 1 | 1 | 1 | 1 | 1 | 1 | 1 | 1 |
| 4 | 1 | 1 | 1 | 1 | 1 | 1 | 1 | 1 | 1 | 1 | 1 | 1 | 1 | 1 | 1 |
| 5 | 1 | 1 | 1 | 1 | 1 | 1 | 1 | 1 | 1 | 1 | 1 | 1 | 1 | 1 | 1 |
| 6 | 1 | 1 | 1 | 1 | 1 | 1 | 1 | 1 | 1 | 1 | 1 | 1 | 1 | 1 | 1 |
| 7 | 1 | 1 | 1 | 1 | 1 | 1 | 1 | 1 | 1 | 1 | 1 | 1 | 1 | 1 | 1 |
| 8 | 1 | 1 | 1 | 1 | 1 | 1 | 1 | 1 | 1 | 1 | 1 | 1 | 1 | 1 | 1 |
| 9 | 1 | 1 | 1 | 1 | 1 | 1 | 1 | 0 | 1 | 1 | 1 | 1 | 1 | 1 | 1 |
| 10 | 1 | 1 | 1 | 1 | 1 | 1 | 0 | 1 | 0 | 1 | 1 | 1 | 1 | 1 | 1 |
| 11 | 1 | 1 | 1 | 1 | 1 | 0 | 1 | 0 | 1 | 0 | 1 | 1 | 1 | 1 | 0 |
| 12 | 1 | 0 | 1 | 0 | 1 | 0 | 1 | 0 | 1 | 0 | 1 | 0 | 1 | 0 | 1 |
| 13 | 1 | 0 | 1 | 0 | 0 | 1 | 0 | 1 | 0 | 1 | 0 | 0 | 1 | 0 | 0 |
| 14 | 1 | 0 | 0 | 1 | 0 | 0 | 0 | 0 | 1 | 0 | 0 | 0 | 1 | 0 | 0 |
| 15 | 0 | 0 | 0 | 0 | 1 | 0 | 0 | 0 | 0 | 0 | 0 | 0 | 0 | 0 | 0 |

| 1 | 2 | 3 | 4 | 5 | 6 | 7 | 8 | 9 | 10 | 11 | 12 | 13 | 14 | 15 | SEG SUM | BASE |
|---|---|---|---|---|---|---|---|---|---|---|---|---|---|---|---|---|
| 1 | 0 | 1 | 0 | 1 | 0 | 1 | 0 | 1 | 0 | 1 | 0 | 1 | 0 | 1 | 24 | 0 |
| 1 | 0 | 1 | 0 | 1 | 1 | 0 | 1 | 0 | 1 | 0 | 1 | 0 | 1 | 1 | 24 | 25 |
| 1 | 0 | 1 | 0 | 1 | 1 | 0 | 1 | 0 | 1 | 1 | 0 | 1 | 1 | 0 | 23 | 50 |
| 0 | 1 | 0 | 1 | 0 | 1 | 0 | 1 | 0 | 1 | 1 | 0 | 1 | 0 | 1 | 22 | 75 |
| 1 | 0 | 1 | 0 | 1 | 0 | 1 | 0 | 1 | 1 | 0 | 1 | 0 | 0 | 1 | 22 | 98 |
| 0 | 1 | 0 | 1 | 0 | 1 | 0 | 1 | 0 | 0 | 1 | 0 | 1 | 0 | 0 | 20 | 121 |
| 0 | 0 | 0 | 1 | 0 | 0 | 1 | 0 | 0 | 1 | 0 | 0 | 0 | 0 | 1 | 19 | 143 |
| 0 | 0 | 0 | 1 | 0 | 0 | 0 | 0 | 1 | 0 | 0 | 0 | 0 | 0 | 0 | 17 | 163 |
| 0 | 0 | 0 | 0 | 0 | 0 | 0 | 1 | 0 | 0 | 0 | 0 | 0 | 0 | 0 | 15 | 182 |
| 0 | 0 | 0 | 0 | 0 | 0 | 0 | 0 | 0 | 0 | 0 | 0 | 0 | 0 | 0 | 15 | 198 |
| 0 | 0 | 0 | 0 | 0 | 0 | 0 | 0 | 0 | 0 | 0 | 0 | 0 | 0 | 0 | 13 | 213 |
| 0 | 0 | 0 | 0 | 0 | 0 | 0 | 0 | 0 | 0 | 0 | 0 | 0 | 0 | 0 | 10 | 226 |
| 0 | 0 | 0 | 0 | 0 | 0 | 0 | 0 | 0 | 0 | 0 | 0 | 0 | 0 | 0 | 8 | 237 |
| 0 | 0 | 0 | 0 | 0 | 0 | 0 | 0 | 0 | 0 | 0 | 0 | 0 | 0 | 0 | 6 | 245 |
| 0 | 0 | 0 | 0 | 0 | 0 | 0 | 0 | 0 | 0 | 0 | 0 | 0 | 0 | 0 | 4 | 251 |
| 0 | 0 | 0 | 0 | 0 | 0 | 0 | 0 | 0 | 0 | 0 | 0 | 0 | 0 | 0 | 1 | 255 |

FIG.10

| SEGMENT | 1 | 2 | 3 | 4 | 5 | 6 | 7 | 8 | 9 | 10 | 11 | 12 | 13 | 14 | 15 | | 1 | 2 | 3 | 4 | 5 | 6 | 7 | 8 | 9 | 10 | 11 | 12 | 13 | 14 | 15 | SEG SUM | BASE |
|---|---|---|---|---|---|---|---|---|---|---|---|---|---|---|---|---|---|---|---|---|---|---|---|---|---|---|---|---|---|---|---|---|---|
| 0  | 1 | 1 | 1 | 1 | 1 | 1 | 1 | 1 | 1 | 1 | 1 | 1 | 1 | 1 | 1 | | 1 | 0 | 1 | 0 | 1 | 0 | 1 | 0 | 1 | 0 | 1 | 0 | 1 | 0 | 1 | 24 | 0   |
| 1  | 1 | 1 | 1 | 1 | 1 | 1 | 1 | 1 | 1 | 1 | 1 | 1 | 1 | 1 | 1 | | 1 | 0 | 1 | 0 | 1 | 0 | 1 | 0 | 1 | 0 | 1 | 0 | 1 | 0 | 1 | 24  | 25  |
| 2  | 1 | 1 | 1 | 1 | 1 | 1 | 1 | 1 | 1 | 1 | 1 | 1 | 1 | 1 | 1 | | 1 | 0 | 1 | 0 | 1 | 0 | 1 | 0 | 1 | 0 | 1 | 0 | 1 | 0 | 1 | 23  | 50  |
| 3  | 1 | 1 | 1 | 1 | 1 | 1 | 1 | 1 | 1 | 1 | 1 | 1 | 1 | 1 | 1 | | 1 | 0 | 1 | 0 | 1 | 0 | 1 | 0 | 1 | 0 | 1 | 0 | 1 | 0 | 0 | 22  | 75  |
| 4  | 1 | 1 | 1 | 1 | 1 | 1 | 1 | 1 | 1 | 1 | 1 | 1 | 1 | 1 | 1 | | 1 | 0 | 1 | 0 | 1 | 0 | 1 | 1 | 1 | 0 | 1 | 0 | 1 | 0 | 1 | 22  | 98  |
| 5  | 1 | 1 | 1 | 1 | 1 | 1 | 1 | 1 | 1 | 1 | 1 | 1 | 1 | 1 | 1 | | 1 | 0 | 1 | 0 | 1 | 0 | 0 | 0 | 1 | 0 | 1 | 0 | 1 | 0 | 1 | 20  | 121 |
| 6  | 1 | 1 | 1 | 1 | 1 | 1 | 1 | 1 | 1 | 1 | 1 | 1 | 1 | 1 | 1 | | 1 | 0 | 1 | 0 | 0 | 0 | 1 | 0 | 1 | 0 | 1 | 0 | 1 | 0 | 1 | 19  | 143 |
| 7  | 1 | 1 | 1 | 1 | 1 | 1 | 1 | 1 | 1 | 1 | 1 | 1 | 1 | 1 | 1 | | 1 | 0 | 1 | 0 | 0 | 0 | 1 | 0 | 1 | 0 | 1 | 0 | 0 | 0 | 1 | 17  | 163 |
| 8  | 1 | 1 | 1 | 1 | 1 | 1 | 1 | 1 | 1 | 1 | 1 | 1 | 1 | 1 | 1 | | 1 | 0 | 1 | 0 | 0 | 0 | 0 | 0 | 1 | 0 | 0 | 0 | 1 | 0 | 1 | 15  | 182 |
| 9  | 1 | 1 | 1 | 1 | 1 | 1 | 1 | 1 | 1 | 1 | 1 | 1 | 1 | 1 | 1 | | 0 | 0 | 1 | 0 | 0 | 0 | 0 | 0 | 0 | 1 | 0 | 0 | 0 | 0 | 1 | 15  | 198 |
| 10 | 1 | 1 | 1 | 1 | 1 | 1 | 1 | 1 | 1 | 1 | 1 | 1 | 1 | 0 | 1 | | 0 | 0 | 0 | 0 | 0 | 0 | 0 | 0 | 1 | 0 | 0 | 0 | 0 | 0 | 0 | 13  | 213 |
| 11 | 1 | 1 | 1 | 1 | 1 | 1 | 1 | 1 | 1 | 1 | 1 | 1 | 0 | 0 | 0 | | 0 | 0 | 0 | 0 | 0 | 0 | 0 | 0 | 0 | 0 | 0 | 0 | 0 | 0 | 0 | 10  | 226 |
| 12 | 1 | 0 | 1 | 0 | 1 | 0 | 1 | 0 | 1 | 0 | 1 | 0 | 1 | 0 | 0 | | 0 | 0 | 0 | 0 | 0 | 0 | 0 | 0 | 0 | 0 | 0 | 0 | 0 | 0 | 0 | 8   | 237 |
| 13 | 1 | 0 | 1 | 0 | 1 | 0 | 1 | 0 | 0 | 0 | 1 | 0 | 0 | 0 | 1 | | 0 | 0 | 0 | 0 | 0 | 0 | 0 | 0 | 0 | 0 | 0 | 0 | 0 | 0 | 0 | 6   | 245 |
| 14 | 1 | 0 | 0 | 0 | 1 | 0 | 0 | 0 | 0 | 0 | 1 | 0 | 0 | 0 | 1 | | 0 | 0 | 0 | 0 | 0 | 0 | 0 | 0 | 0 | 0 | 0 | 0 | 0 | 0 | 0 | 4   | 251 |
| 15 | 0 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 | 0 | 0 | 0 | 0 | 0 | 0 | 1   | 255 |

FIG.11

| MSB Segment | WEIGHT | WEIGHT DEVIATION | Sum of LSB segment |
|---|---|---|---|
| 0 | 0 | - | 24 |
| 1 | 25 | 25 | 24 |
| 2 | 50 | 25 | 23 |
| 3 | 75 | 25 | 23 |
| 4 | 98 | 23 | 22 |
| 5 | 121 | 23 | 20 |
| 6 | 143 | 22 | 19 |
| 7 | 163 | 20 | 17 |
| 8 | 182 | 19 | 15 |
| 9 | 198 | 16 | 15 |
| 10 | 213 | 15 | 13 |
| 11 | 226 | 13 | 10 |
| 12 | 237 | 11 | 8 |
| 13 | 245 | 8 | 6 |
| 14 | 251 | 6 | 4 |
| 15 | 255 | 4 | 1 |

FIG.13

| MSB SEGMENT | NUMBER OF LSB SEGMENT COMBINATIONS | LSB SEGMENT WEIGHT | | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| 0 | 0 | 2 | 1 | 2 | 1 | 2 | 1 | 2 | 2 | 1 | 2 | 1 | 2 | 1 | 2 | 2 |
| 1 | 25 | 2 | 1 | 2 | 1 | 2 | 1 | 2 | 2 | 1 | 2 | 1 | 2 | 1 | 2 | 2 |
| 2 | 50 | 2 | 1 | 2 | 1 | 2 | 1 | 2 | 2 | 1 | 2 | 1 | 2 | 1 | 1 | 2 |
| 3 | 75 | 2 | 1 | 2 | 1 | 1 | 1 | 2 | 2 | 1 | 2 | 1 | 2 | 1 | 1 | 2 |
| 4 | 98 | 2 | 1 | 2 | 1 | 1 | 1 | 2 | 2 | 1 | 2 | 1 | 1 | 1 | 1 | 2 |
| 5 | 121 | 2 | 1 | 2 | 1 | 1 | 1 | 2 | 1 | 1 | 2 | 1 | 1 | 1 | 1 | 2 |
| 6 | 143 | 2 | 1 | 2 | 1 | 1 | 1 | 2 | 1 | 1 | 2 | 1 | 1 | 1 | 1 | 2 |
| 7 | 163 | 1 | 1 | 2 | 1 | 1 | 1 | 1 | 1 | 1 | 2 | 1 | 1 | 1 | 1 | 1 |
| 8 | 182 | 1 | 1 | 1 | 1 | 1 | 1 | 1 | 1 | 1 | 1 | 1 | 1 | 1 | 1 | 1 |
| 9 | 198 | 1 | 1 | 1 | 1 | 1 | 1 | 1 | 1 | 1 | 1 | 1 | 1 | 1 | 1 | 1 |
| 10 | 213 | 1 | 1 | 1 | 1 | 1 | 0 | 1 | 1 | 1 | 0 | 1 | 1 | 1 | 1 | 1 |
| 11 | 226 | 1 | 0 | 1 | 1 | 1 | 0 | 1 | 1 | 1 | 0 | 1 | 1 | 0 | 1 | 0 |
| 12 | 237 | 1 | 0 | 1 | 0 | 1 | 0 | 1 | 0 | 1 | 0 | 1 | 1 | 0 | 1 | 0 |
| 13 | 245 | 1 | 0 | 1 | 0 | 1 | 0 | 1 | 0 | 0 | 0 | 1 | 0 | 0 | 1 | 0 |
| 14 | 251 | 1 | 0 | 0 | 0 | 1 | 0 | 0 | 0 | 0 | 0 | 1 | 0 | 0 | 1 | 0 |
| 15 | 255 | 0 | 0 | 0 | 0 | 1 | 0 | 0 | 0 | 0 | 0 | 1 | 0 | 0 | 0 | 0 |

DIRECT DIGITAL FREQUENCY SYNTHESIZER USING VARIABLE SINE WAVE-WEIGHTED DIGITAL TO ANALOG CONVERTER AND SYNTHESIZING METHOD THEREOF

BACKGROUND OF THE INVENTION

1. Field of the Invention

The present invention relates to direct digital frequency synthesis, and more particularly, to a direct digital frequency synthesizer using a variable sine wave-weighted digital to analog converter with improved size and efficiency, which is capable of synthesizing analog signals with high quality without performing complicated gradient calculation requiring a separate base decoding, and a synthesizing method thereof.

2. Description of the Related Art

With the necessity of high speed processing systems with advances in information & communication technologies, there is an increasing need for high speed digital frequency synthesis systems which are capable of synthesizing a desired frequency at a high speed.

In general, a frequency synthesis system includes a direct frequency type and an indirect frequency type. The indirect frequency type, such as a phase locked loop (PLL) frequency synthesizer, requires a voltage controlled oscillator (VCO), thereby producing phase noises, and has a feedback loop, thereby providing great latency for frequency synthesis as well as providing coarse frequency resolution. For the purpose of overcoming this problem, there have been mainly used direct digital frequency synthesizers with small latency for frequency synthesis, low phase noise, and relatively fine frequency resolution for precise and high speed frequency synthesis.

Since a direct digital frequency synthesizer (DDFS) is capable of instantaneous phase and frequency conversion over a wide band and provision of correct phase and frequency without signal discontinuity owing to a merit of digital, it is suitable for high speed precise frequency synthesis and is mainly applied to radars and wireless communications requiring high speed phase and frequency hopping. The direct digital frequency synthesizer has an increasing application range to various fields for applications by simplifying its hardware configuration and hence reducing production costs. In addition, since portions, except for a digital to analog converter (DAC), are implemented by digital circuits, use of DDFSs is on the rise with increase of integration of semiconductor integrated circuits.

FIG. 1 shows a general DDFS configuration. As shown, a DDFS includes a phase accumulator 10 for accumulating frequency control words (FCWs) to generate new phase data for each sampling clocks with phase angles (0 to $2\pi$) around a circle through overflow, a phase to amplitude mapper (PAM) for discretely mapping the phase data provided by the phase accumulator 10 onto amplitudes corresponding to sine waves, and a digital to analog converter (DAC) 30 for converting discrete amplitudes provided by the PAM 20 into an analog signal having a desired frequency form.

Methods of mapping phase onto amplitude in the PAM 20 may include, for example, a method of using a read only memory (ROM), a method of using Taylor series, a method of using a coordinated rotation digital computer (CORDIC), etc.

Although the method of using ROM provides various schemes for size reduction, this method is still low in space efficiency and has additional complicated circuits for size reduction, thereby consuming much power. Therefore, the method of using Taylor series or the method of using CORDIC has been indeed used to minimize the use of ROM.

However, both of the method of using Taylor series and the method of using CORDIC require a very complicated operation configuration and still a ROM of a look-up table scale, thereby still raising a problem of high power consumption and delay due to complexity without providing particular integration efficiency.

FIG. 2 shows a configuration of DDFS using a sine-weighted DAC for directly converting an output of a phase accumulator into a sine waveform without using the above-mentioned PAM. As shown, the above-described complicated configuration can be simplified by applying a sine-weighted DAC 50 for outputting sine waves in a manner to selectively switch current sources configured to be adapted for sine waves using phase information provided by a phase accumulator 40.

However, in this case, the configuration of current sources for generating precise sine waveforms is difficult to be achieved with increase of a resolution and requires an exponential increase in area. For example, a configuration of DDFS having a resolution of 9 bits or so requires hundreds of switches and current sources having different weights, which results in difficulty in its design and increase in its required area.

In recent years, in order to alleviate the above-described problems, there has been employed a scheme of configuring a PAM for converting FCW into binary codes having an amplitude of a sine waveform and configuring a linear DAC for converting the binary codes into a sine wave using a control unit having relatively low complexity.

FIG. 3 shows an example configuration of a conventional direct digital frequency synthesizer in which phases provided by a phase accumulator are mapped onto binary codes and a linear DAC for generating an output based on the binary codes is applied. As shown, the conventional direct digital frequency synthesizer includes a PAM 160 for generating binary codes using phase information provided by a phase accumulator 110, and a linear DAC 170 for converting the binary codes output from the PAM 160 into an analog signal. The PAM 160 includes a base decoder 130 for generating base point information to set a basic position of amplitude using some upper bits of output bits of the phase accumulator 110, a gradient generator 150 for generating a gradient to set an extension amplitude value for linear approximation in conformity to a sine waveform between base points using lower bits of the output bits of the phase accumulator 110, and complementors 120 and 140 for extensionally map ¼ sine wave amplitude information obtained by the base decoder 130 and the gradient generator 150 onto a sine wave of one period as a whole using two most significant bits of the phase accumulator 110.

The above-described method is a method of setting positions of base amplitudes by means of the base decoder 120 and approximating a gradient interconnecting points between the set base amplitudes (that is, coarse segments for amplitude) by combining a plurality of gradient values, thereby generating final binary information in the PAM 160 in consideration of all of them.

Although the above-described method may configure a DDFS with no ROM, it requires pipelines of a considerable size for high speed operation and still has a problem of configuration of complicated operators.

That is, a considerably complicated logic configuration is required for the base decoder 42 for obtaining base points, and large-scaled pipelines are required for its output. In addition, an operator having the same size as output bits of the base decoder 120 is required for operation of such base points and gradients, and also pipelines are required accordingly, which results in complexity of configuration. Such complexity of configuration leads to low integration, high costs, high power consumption and operation delay. Accordingly, such an existing complicated configuration has to be simplified for expansion of an application range of DDFS.

In the end, there is a need of DDFS of a new form which is capable of increasing integration, saving power and maintaining or improving output quality by overcoming such configuration complexity and simplifying a configuration of PAM, which occupies the most portion of an actual total area, to decrease its area.

SUMMARY OF THE INVENTION

In order to overcome the above problems, it is an object of the present invention to provide a direct digital frequency synthesizer using a variable sine wave-weighted digital to analog converter, and a synthesizing method thereof, which are capable of simplifying a configuration for matching output data of a phase accumulator to sine wave amplitude without increase in complexity of a DAC by applying a nonlinear DAC for directly generating a current corresponding to base points with sine weights and a variable sine wave-weighted DAC for generating fine currents to be combined with variable weights based on the base points.

It is another object of the present invention to provide a direct digital frequency synthesizer using a variable sine wave-weighted digital to analog converter, and a synthesizing method thereof, which are capable of extremely simplifying a configuration for generation of a voltage corresponding to base points by causing a nonlinear DAC to directly generate base point values and capable of implementing a variable sine wave-weighted DAC configuration for fine current generation with a simple structure with no operator by generating a fine current for a sine wave output through a combination of segments whose weights are varied by the base points.

It is still another object of the present invention to provide a direct digital frequency synthesizer using a variable sine wave-weighted digital to analog converter, and a synthesizing method thereof, which are capable of providing fine segments adaptively corresponding to a wide range of gradient by combining a plurality of switches corrected respectively to unit current sources using lower bit information of an output of a phase accumulator in order to generate fine segments and by varying the number of switches combinable for the same lower bit information according to coarse segment values based on upper bit information of the output of the phase accumulator.

It is yet still another object of the present invention to provide a direct digital frequency synthesizer using a variable sine wave-weighted digital to analog converter, and a synthesizing method thereof, which are capable of providing a high quality output with a simple configuration by simplifying a PAM configuration as compared to a case where a linear DAC is used and simplifying a DAC configuration as compared to a case where only a nonlinear DAC is used.

It is yet still another object of the present invention to provide a direct digital frequency synthesizer using a variable sine wave-weighted digital to analog converter, and a synthesizing method thereof, which are capable of providing an output resolution similar to an existing resolution while increasing a speed and reducing power consumption and a confirmation area by configuring the direct digital frequency synthesizer with only decoders and logics without a complicated operator and controller.

To achieve the above objects, according to an aspect of the invention, there is provided a direct digital frequency synthesizer using a variable sine wave-weighted digital to analog converter (DAC), including: a phase accumulator that accumulates control words to provide phase information; a nonlinear DAC part that determines base points using upper first data of the phase information of the phase accumulator and generates a corresponding coarse segment current; and a variable DAC part that varies weights of segments selected according to lower second data of the phase information of the phase accumulator on the basis of the base points determined in the nonlinear DAC part and generates a fine segment current combined to the determined base points such that the fine segment current is sine-weighted.

Preferably, the nonlinear DAC part and the variable DAC part include a plurality of complementors that extend a phase for amplitude of a ¼ sine wave region, which is obtained using the first and second data, using the most significant third data of the phase information of the phase accumulator.

Preferably, the direct digital frequency synthesizer further includes a one bit DAC part that selectively shifts the amplitude obtained from the first and second data using one bit data of the third data.

Preferably, the nonlinear DAC part includes: a first thermometer decoder that thermometer-decodes the first data; a plurality of first switches operated one by one depending on an output of the first thermometer decoder; and sine-weighted nonlinear current sources connected respectively to the plurality of first switches.

Preferably, the nonlinear DAC part includes: a second thermometer decoder that thermometer-decodes the second data; a logic part that combines a plurality of segments depending on an output of the second thermometer decoder while varying weights of the segments on the basis of the output of the first thermometer decoder; a plurality of second switches operated corresponding to the segment combination according to an output of the logic part; and current sources connected respectively to the plurality of second switches.

Preferably, the logic part includes an AND gate.

Preferably, the logic part is sine-weighted with an adaptive resolution by varying the number of unit segments, which will be simultaneously used on the basis of the output of the first thermometer decoder, of unit segments which are arranged on the basis of two times the number of outputs of the second thermometer decoder and selectively provide unit current sources, respectively.

Preferably, the number of unit segments arranged on the basis of two times the number of outputs of the second thermometer decoder can be reduced by changing combination of the unit segments.

Preferably, the variable DAC part includes: a second thermometer decoder that thermometer-decodes the second data; second switches which are operable in combination and more than the number of outputs of the second thermometer decoder, and unit current sources connected respectively to the second switches; and a logic part that outputs a sine-weighted fine voltage by varying the number of second switches combinable according to the outputs of the second thermometer decoder on the basis of the output of the first thermometer decoder.

Preferably, the operations of switch combinations according to the outputs of the second thermometer decoder are equal to each other, and the number of second switches corresponding to units of combinations according to the output of the first thermometer decoder can be selectively varied.

According to another aspect of the invention, there is provided a direct digital frequency synthesizer using a variable sine wave-weighted digital to analog converter (DAC), including: a phase accumulator that accumulates control words to provide phase information; a plurality of complementors that, based on the most significant two bit data of the phase information of the phase accumulator, extends a phase by performing a selective complementary operation for the remaining data of the phase information of the phase accumulator; a nonlinear DAC part that thermometer-decodes next upper first data of the phase information of the phase accumulator and generates a coarse segment current by operating one of switches, to which nonlinear current sources are respectively connected, according to a thermometer-decoding output; and a variable DAC part that performs an AND operation for a thermometer-decoding output of lower second data of the phase information of the phase accumulator and the thermometer-decoding output of the first data and generates a sine-weighted fine segment current by varying and combining the number of combinable switches used, which are connected respectively to unit current sources, according to the thermometer-decoding output of the first data.

Preferably, the variable DAC part includes combinable basic switches of the same number as thermometer-decoding outputs of the second data, a plurality of additional selectable switches, and a logic part that interlocks the additional selectable switches with the basic switches according to the thermometer-decoding output of the first data.

Preferably, the combinable number of the basic switches according to the thermometer-decoding outputs of the second data is equal to the number of the thermometer-decoding outputs, and, according to the thermometer-decoding output of the first data, the basic switches for the combination are varied such that the basic switches are operated or not, or two switches are operated by interlocking an additional switch with a basic switch.

According to still another aspect of the invention, there is provided a method of synthesizing a direct digital frequency using a variable sine wave-weighted digital to analog converter (DAC), including: a data dividing step of dividing an output of a phase accumulator into first data for designating base points and second data for obtaining an additional value approximate to a sine wave; a coarse current generating step of thermometer-decoding the first data and operating switches connected respectively to sine-weighted nonlinear current sources according an thermometer-decoding output; a fine current generating step of performing a logical operation for an thermometer-decoding output of the second data and the thermometer-decoding output of the first data and generating a fine current by combining segments variably weighted according to the thermometer-decoding output of the first data; and a summing step of summing the generated coarse current and fine current to generate a current corresponding to a sine wave amplitude.

Preferably, the fine current generating step further includes a step of varying the number of the switches corresponding to the segments according to the thermometer-decoding output of the first data and a step of generating a sine-weighted nonlinear fine current by a preset segment combination according to the thermometer-decoding output of the second data.

Preferably, the switches are respectively connected to unit current sources and the number of variable switches is 0 to 2.

Preferably, the maximum number of the switches simultaneously corresponding to the segments is larger than the number of thermometer-decoding outputs of the second data and smaller than two times the number of thermometer-decoding outputs of the second data.

Preferably, the data dividing step further includes a step of generating third data for extension of a generated amplitude phase, the coarse current generating step and the fine current generating step further include a step of performing a complementary operation for process-targeted data at a plurality of positions based on the third data, and the summing step further includes a step of shifting an output current corresponding to the sine wave amplitude based on the third data.

According to an embodiment of the present invention, since a direct digital frequency synthesizer using a variable sine wave-weighted digital to analog converter and a synthesizing method thereof are capable of simplifying a configuration for matching output data of a phase accumulator to sine wave amplitude without increase in complexity of a DAC by applying a nonlinear DAC for directly generating a current corresponding to base points with sine weights and a variable sine wave-weighted DAC for generating fine currents to be combined with variable weights based on the base points, it is possible to provide a high quality output and reduce a size and power consumption.

According to an embodiment of the present invention, since a direct digital frequency synthesizer using a variable sine wave-weighted digital to analog converter and a synthesizing method thereof are capable of extremely simplifying a configuration for generation of a voltage corresponding to base points by causing a nonlinear DAC to directly generate base point values and capable of implementing a variable sine wave-weighted DAC configuration for fine current generation with a simple structure with no operator by generating a fine current for a sine wave output through a combination of segments whose weights are varied by the base points, it is possible to significantly reduce power consumption and increase its speed.

According to an embodiment of the present invention, a direct digital frequency synthesizer using a variable sine wave-weighted digital to analog converter and a synthesizing method thereof are capable of providing fine segments corresponding to a wide range of gradient with an adaptive precision even using a limited lower bit information size by combining a plurality of switches corrected respectively to unit current sources using lower bit information of an output of a phase accumulator in order to generate fine segments and by varying the number of switches combinable for the same lower bit information according to coarse segment values based on upper bit information of the output of the phase accumulator.

According to an embodiment of the present invention, a direct digital frequency synthesizer using a variable sine wave-weighted digital to analog converter and a synthesizing method thereof are capable of providing a high quality output with a simple configuration and low power consumption as compared to an existing DDFS having a corresponding resolution by simplifying a PAM configuration as compared to a case where a linear DAC is used and simplifying a DAC configuration as compared to a case where only a nonlinear DAC is used.

According to an embodiment of the present invention, a direct digital frequency synthesizer using a variable sine wave-weighted digital to analog converter and a synthesizing method thereof are capable of increasing a speed and reducing power consumption and a confirmation area by configuring the direct digital frequency synthesizer with only decoders and logics without a complicated operator and controller.

BRIEF DESCRIPTION OF THE DRAWINGS

The above and/or other aspects and advantages of the present invention will become apparent and more readily appreciated from the following description of the embodiments, taken in conjunction with the accompanying drawings of which:

FIGS. 9 and 10 are arrangement conceptual views for explaining a variable weight application combination according to an embodiment of the present invention;

FIG. 11 is a table showing weights of a nonlinear DAC part according to an embodiment of the present invention;

FIG. 13 is a table showing a segment combination and its weights of a variable DAC part according to an embodiment of the present invention;

DETAILED DESCRIPTION OF THE PREFERRED EMBODIMENT

Hereinafter, the present invention will be described in detail by way of exemplary embodiments in conjunction with the accompanying drawings.

Figure 1:
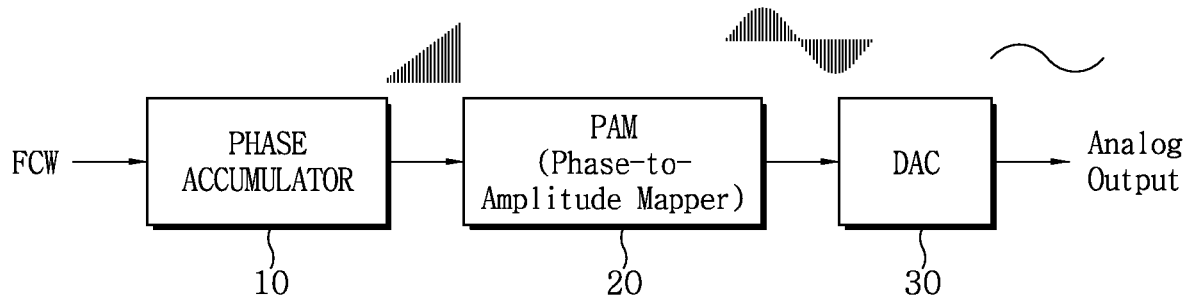
FIG. 1 is a view showing a configuration of a general direct digital frequency synthesizer (DDFS)
Figure 2:
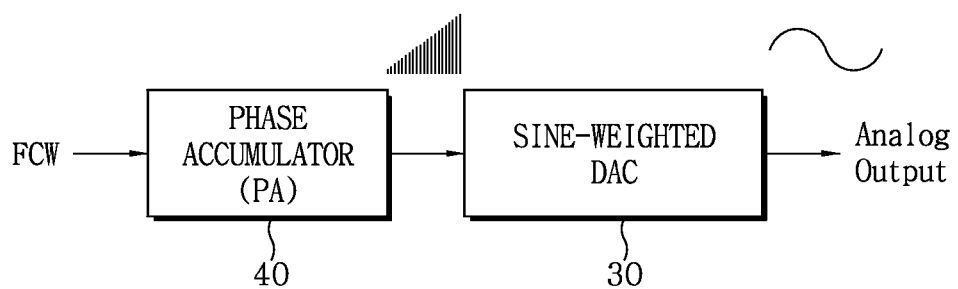
FIG. 2 is a view showing a configuration of DDFS using a general nonlinear DAC.
Figure 3:
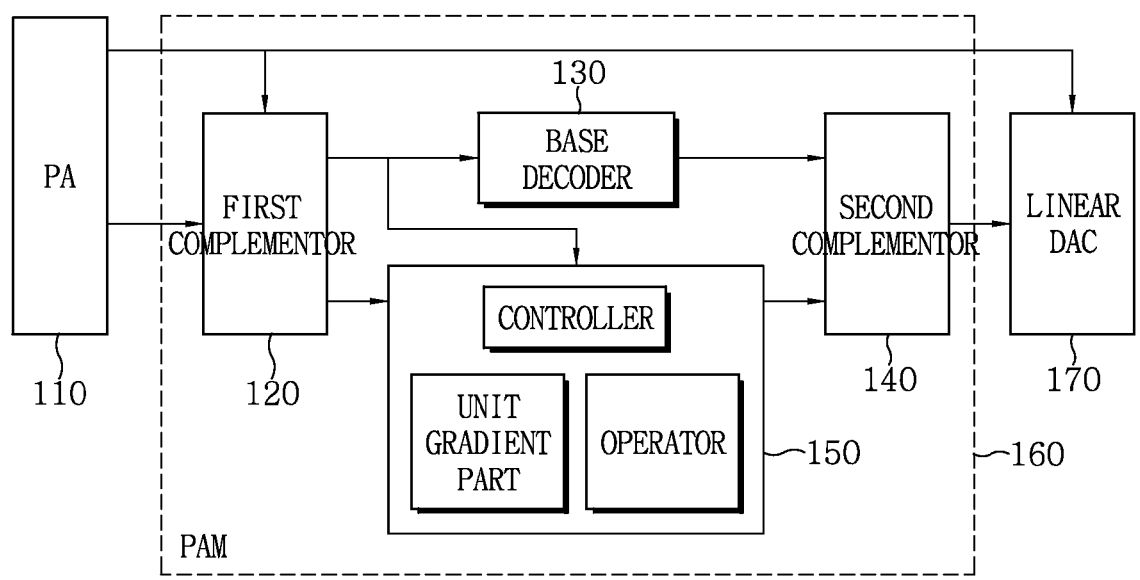
FIG. 3 is a view showing a configuration of a conventional direct digital frequency synthesizer.
Figure 4:
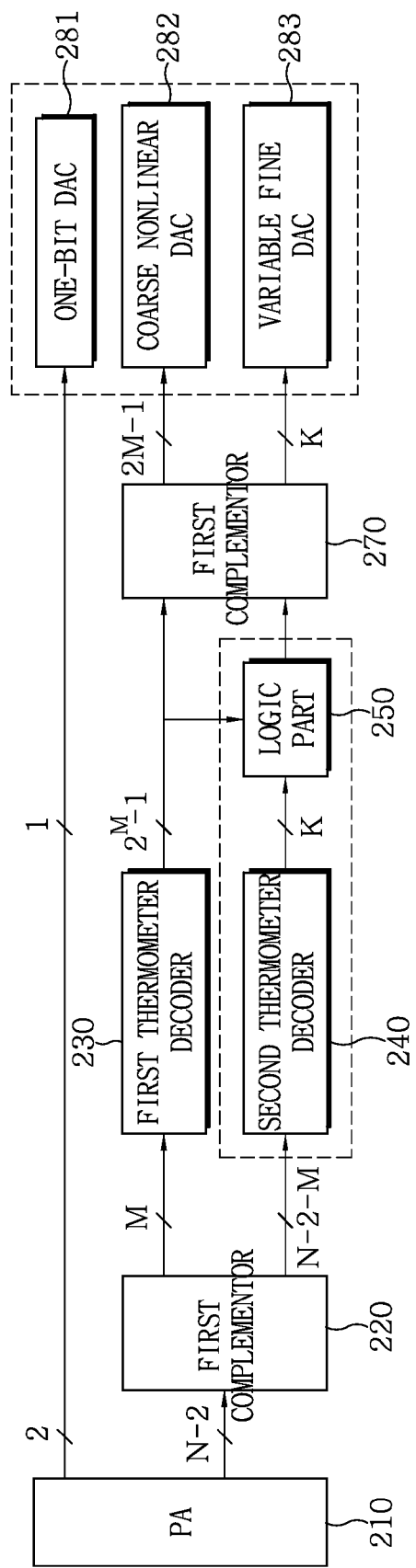
FIG. 4 is a view showing a configuration of a direct digital frequency synthesizer according to an embodiment of the present invention.

FIG. 4 shows a configuration of a direct digital frequency synthesizer (DDFS) according to an embodiment of the present invention. It can be seen from this figure that the configuration of DDFS for converting phase output information of a phase accumulator (PA) 210 into sine wave amplitude through thermometer decoders 230 and 240 and a logic part 250 is so simplified, excluding a complicated controller and operator.

Figure 6:
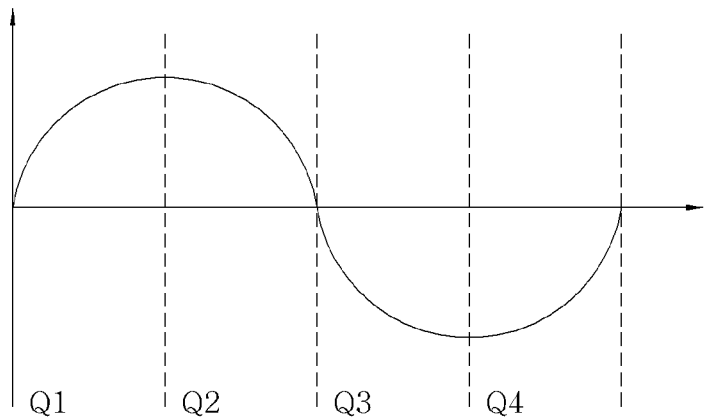
FIG. 6 is a conceptual view for explaining ¼ sine wave phase extension.

It can be also seen from this figure that the DDFS is configured to include complementors 220 and 270 for extending general ¼ sine wave amplitude to a band of one period of a sine wave as a whole and a one bit DAC 281 for phase shifting. Such a configuration is basically applied to most of DDFSs and is for extending a phase for an output of a configuration to generate a ¼ sine wave amplitude. Referring to FIG. 6, the configuration of DDFS is simplified in a manner to generate sine wave amplitude generally located in a Q1 quadrant and extend its phase in Q2 to Q4 quadrants by inverting or shifting the amplitude. That is, several most significant bits (mostly 2 bits) of the phase information provided by the phase accumulator PA 210 are used as data to control the phase extension and the remaining bits are used to generate the ¼ sine wave amplitude to substantially determine quality of DDFS.

Such a configuration to generate a ¼ sine wave amplitude includes a nonlinear DAC part including a first thermometer decoder 230 for determining coarse segments with a low resolution for a sine wave amplitude to be generated using data of upper M bits of some bits (N−2) for amplitude generation in the phase information (N bits) provided by PA 210 and a coarse nonlinear DAC 282 for generating a nonlinear current of a corresponding coarse segment based on an output of the first thermometer decoder 230, and a variable DAC part including a second thermometer decoder 240 for determining fine segments to be added, for sine wave approximation, to the coarse segments determined by the upper M bits of the sine wave amplitude to be generated using data of lower N−2−M bits of some bits (N−2) for the amplitude generation, a logic part 250 for performing a logical operation for an output of the first thermometer decoder 230 and an output of the second thermometer decoder 240 to variably determine weights of the fine segments depending on weights of the coarse segments, and a variable fine DAC 283 including a plurality of switches operating in combination according to an output of the logic part 250 and current sources respectively connected to the switches.

That is, the configuration to generate a substantial ¼ sine wave amplitude includes the nonlinear DAC part for generating the coarse segments with the upper M bit data as its input and the variable DAC part for generating a variable fine segment current with the coarse segment determination information as its control information.

Although a DAC part 280 including the coarse nonlinear DAC 282 and the variable fine DAC 283 is separately shown, the coarse nonlinear DAC 282 is substantially constituted by switches, each of which can be selected, and sine-weighted nonlinear current sources respectively connected to the switches, and the variable fine DAC 283 is substantially constituted by a plurality of combinable switches and current sources respectively connected to the switches.

Since a linear DAC or nonlinear DAC typically includes an internal decoder, the shown coarse nonlinear DAC 282 or variable fine DAC 283 substantially corresponds to a 'switch & current source' configuration applied as a termination configuration to a general DAC. That is, since a combination of the first thermometer decoder 230 and the coarse nonlinear DAC 282 corresponding to a 'switch & nonlinear current source' is generally called DAC, the nonlinear DAC part for generating the coarse segments or the variable DAC part for generating the variable fine segments in the shown configuration substantially corresponds to a configuration regarded as a single DAC in general conventional techniques.

Accordingly, the shown configuration according to the embodiment of the present invention does not require a separate base decoder for generating coarse segment corresponding to base points with a low resolution and also does not require a complicated controller and operator for generating fine segments.

Figure 5:
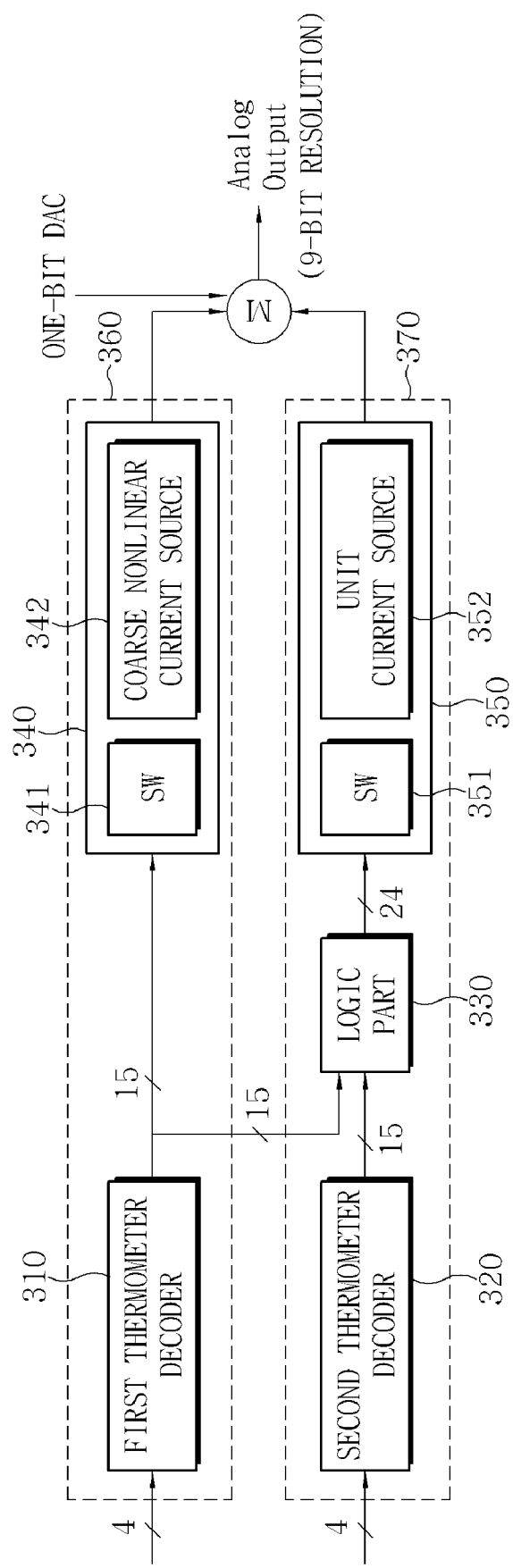
FIG. 5 is a view showing a configuration of a sine wave amplitude generating part according to an embodiment of the present invention.

FIG. 5 is a configuration view separately showing the nonlinear DAC part and the variable DAC part for generating the ¼ sine wave amplitude according to the embodiment of the present invention. This figure shows a case where, if an output of the PA consists of 10 bits, the most significant 2 bits are used for phase extension and shifting of amplitude, the upper 4 bits of the remaining 8 bits are used for generation of coarse segments, and the lower 4 bits are used for generation of fine segments.

As shown, a nonlinear DAC part 360 selects one of first switches 341 respectively connected to coarse nonlinear sources 342, which nonlinearly provide coarse segment currents corresponding respectively to base points, by using a 15 bit output of a first thermometer decoder 310 for determining coarse segments from a signal of the upper 4 bits, and outputs a corresponding current. Here, the first switches 341 and the coarse nonlinear current sources 342 correspond to a coarse nonlinear DAC 340.

In addition, a variable DAC part 370 uses a logic part 330 to perform an operation for a 15 bit output of a second thermometer decoder 310 for determining the fine segments from a signal of the lower 4 bits and the output of the first thermometer decoder 310, that is, the 15 bit output corresponding to weights of the coarse segments or base point information, and outputs a current summed by operating second switches 351 respectively connected to unit current sources 352 in combination. Here, the second switches 351 and the unit current sources 352 correspond to the variable fine DAC 283.

Since the outputs of the nonlinear DAC part 360 and variable DAC part 370 are provided in the form of a current, the shown summing part is not configured as a separate element. In the meantime, since an output of a one bit DAC is added to this summing part for phase extension, the output from the summing part substantially has a resolution of 9 bits.

The nonlinear DAC part 360 configures the nonlinear sign-weighted current sources as coarse nonlinear current sources, thereby requiring no separate complicated operation.

In addition, since the nonlinear DAC part 360 is implemented by a nonlinear current configuration for a limited bit size, it is efficient from the standpoint of current consumption and area.

In addition, since the variable DAC part 270 can be also implemented by a thermometer decoder, a simple logic, the limited number of switches, and one or two kinds of current sources (single current source depending on a scheme), it requires the significantly decreased number of required switches and current sources as compared when it includes only the nonlinear DAC. In addition, if an linear DAC is applied, it becomes difficult to generate fine segments to satisfy precision of both of a portion having a large gradient between coarse segments between and a portion having a small gradient between the coarse segments due to a low resolution of the lower 4 bits. However, in this embodiment of the present invention, by introducing a variable segment scheme to adaptively vary the resolution depending on a degree of gradient between the coarse segments, this problem can be overcome and it is possible to generate a sine wave of sufficient quality even with a small number of bits.

In the meantime, in the shown example, the logic part 330 prepares information for generation of fine segments using the 15 bit output decoded through the second thermometer decoder 320. For example, if a linear DAC for generating segments by linearly analyzing this 4 bit information is used, only 15 kinds of signals can be generated, which may lead to low quality of fine segments, and, accordingly, it should be made nonlinear and processed with a sine weighting scheme. To this end, when a nonlinear DAC is configured, it requires too many kinds of nonlinear current sources, which is not preferable in that efficiency is low due to complexity of the DAC configuration and increase in an area.

Accordingly, in the embodiment of the present invention, segments (units to be combined to generate fine segments) are combined based on an output of the second thermometer decoder 320, and the logic part 330 is configured to vary weights of the segments to be combined based on the output of the second thermometer decoder 320 using the output of the first thermometer decoder 310, so that fine segments can be generated with the combination of segments having different weights depending on the kind of coarse segments.

Figure 7:
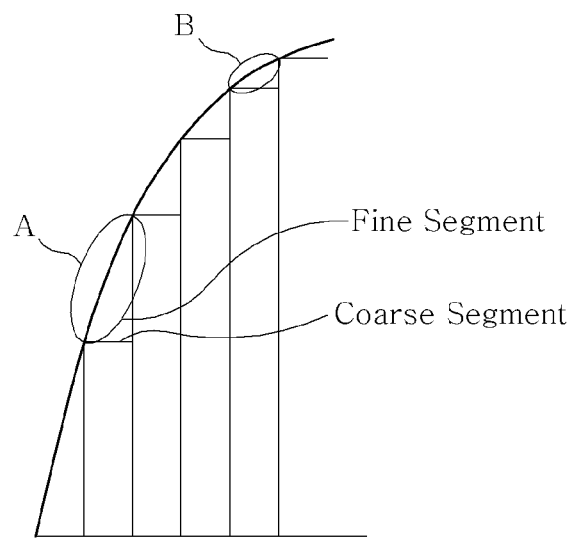
FIG. 7 is a conceptual view showing a DAC output waveform combination scheme according to an embodiment of the present invention.

FIG. 7 is a conceptual view for explaining a combination method of coarse segments and fine segments and necessity to vary the fine segments. In general, outputs having a low resolution corresponding to base points determined by upper bits are maintained for an output period of the phase accumulator when lower bits are varied. A form that base point values are maintained for a period of time in this manner may be called coarse segment, and an actual current output applied with weights corresponding to the base points may be called coarse segment current. On the other hand, an additional current is added to the coarse segment in order to generate an output approximate to a sine wave, and the added current is maintained for an output period (that is, a period of operation clock) of the phase accumulator, which is called fine segment.

It can be seen from the figure that deviation of coarse segments to meet an amplitude increase curve of a sine wave having a nonlinear characteristic is large at first and gradually decreases. That is, it can be seen that a gradient between coarse segments at portion A is apparently different from that at portion B.

In other words, when fine segments to be added to coarse segments are generated, if the fine segments are configured to have a linear characteristic, it is difficult to generate fine segments to be added to meet a coarse segment gradient reaching the maximum of 63. 4349° (the coarse segment generation scheme according to the 4 bit MSB in the above example) with a gradient of 45° (this gradient may be smaller than 45° in consideration of a minimum precision) according to a linear increase. If the unit of linear increase is high, although an error between coarse segments having a large gradient, which may be generated when fine segments are applied, may be small, a large error may be generated in coarse segment portions having a small gradient or requiring a precise adjustment as the unit value of fine segments become large.

In the end, a resolution of the fine segments has to be increase by decreasing the gradient or increasing the number of lower bits for generation of fine segments by increasing the number of upper bits for selection of coarse segments to closely arrange the coarse segments after increasing output bits of the phase accumulator. However, in this case, a burden of complexity and size increase become large.

However, the embodiment of the present invention overcomes the above problem by adaptively varying a resolution of fine segments without increasing the output bits of the phase accumulator and without increasing the resolution of coarse segments.

Figure 8:
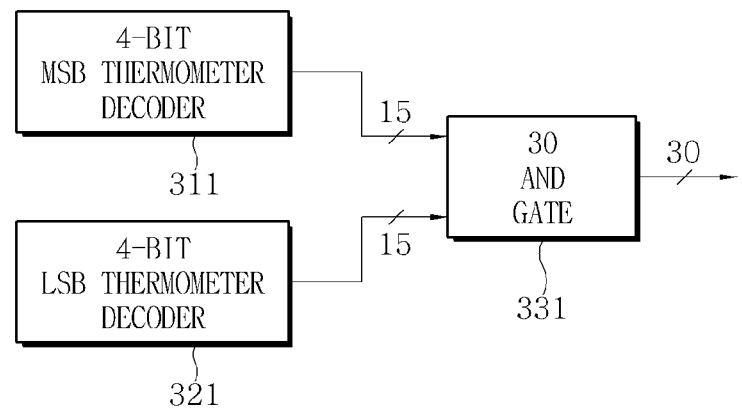
FIG. 8 is a configuration view for explaining a variable weight setting scheme according to an embodiment of the present invention.

FIG. 8 is a view for explaining a method of generating variable fine segments according to an embodiment of the present invention. In this method, for example, coarse segment information determined by upper 4 bit data is obtained from an MSB (most significant bit) 4 bit thermometer decoder 311, fine segment information determined by lower 4 bit data is obtained from an LSB (Least significant bit) 4 bit thermometer decoder 321, and a logic part constituted by an AND gate 331 can obtain an extended output of 30 bits by performing a logical operation for information of 15 bits, which are output from the respective thermometer decoders 311 and 321.

That is, the limited selectable number of 15 of outputs of the LSB thermometer decoder 321 is extended to 30. It is noted that such extension is not only simply to increase the output of the LSB thermometer decoder but also to variably adjust the output of the LSB thermometer decoder on the basis of the output of the MSB thermometer decoder 311.

In other words, if a large fine segment current value is required depending on the kind of coarse segments meant by the output of the MSB thermometer decoder 311, the information for generation of fine segments by the output of the LSB thermometer decoder 321 uses most of the 30 outputs of the shown AND gate 331, while, if a small and precise fine segment current value is required depending on the kind of coarse segments, the information for generation of fine segments by the output of the LSB thermometer decoder 321 uses some (one at minimum) of the 30 outputs of the shown AND gate 331, thereby variably determining how many outputs of the AND gate 331 interlock with the output of the LSB thermometer decoder 321 depending on the kind of current coarse segments.

Since the above-described method according to one embodiment of the present invention is to make the outputs of the AND gate 331 interlocking with the 15 outputs of the LSB thermometer decoder 321 different from each other depending on the coarse segments, it is possible to use a scheme of connecting the 30 outputs of the AND gate 331 to the combinable switches connected to the unit current sources. That is, it is possible to use a scheme of adjusting the variableness of weights to the number of switches operable at a time.

For example, it is possible to operate only some of the outputs of the AND gate 331 by the outputs of the LSB thermometer decoder 321 in a region having a small deviation between coarse segments, while operating most of the outputs of the AND gate 331 by the outputs of the LSB thermometer decoder 321 in a region having a large deviation between coarse segments.

Of course, although the weights may be adjust to adjust the number of switches, the weights may be adjusted by selecting switches connected to the different kinds of current sources.

FIG. 9 is a view for explaining a initially developed logical operation method of the AND gate shown in FIG. 8. In this figure, left segments means coarse segments, and two middle arrangements each having 15 segments, mean the number of switches combinable depending on the outputs of the LSB thermometer decoder. Numbers of the top of the arrangements may be regarded as segments. The segment sum (seg sum) in the right side means the sum of unit segments (that is, the number of combinable switches) when the combinable switches are considered as the unit segments respectively constituting fine segments), and the rightmost base means base point values, that is, weights for coarse segments.

The reason for the two arrangements representing the number of switches combinable depending on the outputs of the LSB thermometer decoder is that these substantial combinations are determined by LSB in extending the 15 bit outputs to 30 bits.

This means that, when the same columns in the left arrangement framed with the double line are selected, switches of the same columns in the right arrangement framed with the single line are controlled as well. Accordingly, the fine segment combination information depending on the outputs of the LSB thermometer decoder is for combining the segments in the left arrangement framed with the double line, and the segments are assigned with different numbers of the switches operable at once depending on the kind of coarse segments.

For example, if a coarse segment is 0, since a fine segment having the largest value has to be provided, it can be seen from the left arrangement framed with the double line that all switches are in an operable state and it can be seen from the right arrangement framed with the single line that 9 switches are in an operable state. That is, the number of switches operable at once is 24. In this case, if a switch corresponding to No. 1 in the left side is operated, a switch corresponding to No. 1 in the right side is operated together. That is, the two switches are simultaneously operated at one selection. On the other hand, if a switch corresponding to No. 2 in the left side is operated, since a switch corresponding to No. 2 in the right side is not assigned, only one switch is operated. If a coarse segment is 15, since a switch is not assigned for No. 1 in the left side and a switch is also not assigned for No. 1 in the right side, the switches are not operated even at a selection of No. 1.

In the shown configuration, the maximum and minimum number of switches used, that is, the sums of segments selectable at once, are 24 and 1, respectively. This means that, if a fine segment current provided when one segment is selected in the minimum state is assumed as a basis of the unit current sources, a fine segment current in the maximum state corresponds to turning-on of 24 unit current sources.

As shown, although the maximum number of switches selectable at once is 24, it can be seen that these switches are distributed over the total of 30 positions.

That is, if a hardware is implemented according to the logical operation method shown in FIG. 9, the structure of the hardware can be very much complicated. Accordingly, the number of switches required need to be reduced by recombining switches to reduce the number of switches with the same sum of segments.

FIG. 10 shows re-configuration of the arrangements of FIG. 9 to reduce the number of switches. As shown, since there is no need to connect switches in columns 2, 4, 6, 9, 11 and 13 of the right arrangement framed with the single line, which have switches not operated at all, the number of switches required can be reduced to 24. Also only the thermometer code can directly control AND gates without a controller. Thereby the structure including only the thermometer decoder and AND gate can be obtained.

Accordingly, for segments for combination of fine segments depending on a selection of coarse segments, there may be cases where no switch is connected, one switch is connected, and two switches are connected.

This means that a nonlinear current increase arrangement can be configured by combining a case where a unit current is increased by tow times and a case where the unit current is increased by one time even for a fine segment for one coarse segment, and weights for such a combination are varied even when the coarse segments are varied, such that a fine segment to be applied to each coarse segment can be adjusted to an appropriate resolution.

According to the above-described switch re-arrangement, the output of the logic part 330 shown in FIG. 5 can have 24 bits.

FIG. 11 is a table showing weights of coarse segments, which shows a case where the 4 bit MSB shown in FIGS. 5 and 8 is used. As shown, a weight deviation gradually decreases and the number of segments to be combined through LSB, that is, the number of switches operable at once, is nonlinearly reduced as the weight deviation decreases.

Figure 12:
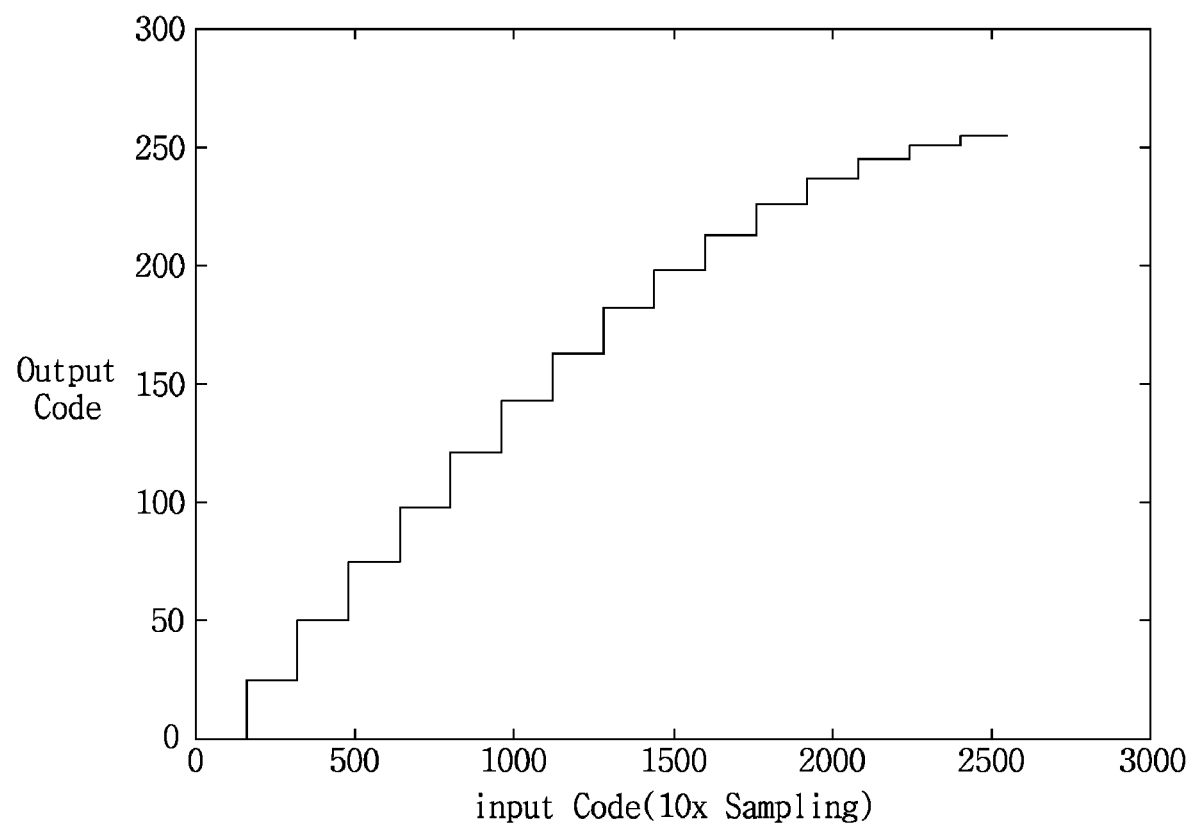
FIG. 12 is a view showing an output waveform of a nonlinear DAC part according to an embodiment of the present invention.

FIG. 12 is a graph of the coarse segments shown in FIG. 11. As shown, as a phase increases, an amplitude increase value is nonlinearly reduced and output in a form following a trace of a ¼ sine wave curve.

The shown graph shows an output on the basis of 8 bit phase data for generation of ¼ sine wave amplitude of the bit phase data output from the phase accumulator except the most significant 2 bits for ¼ sine wave phase extension. In the end, since this output is a nonlinear output for the upper 4 bits, segments as unit outputs are generated with a corresponding output value maintained while the lower 4 bits are varied, and segments. Since these coarse segments have to represent all ¼ sine wave amplitude with a low phase resolution of 4 bits, the coarse segments are coarsely represented in a stepped manner and becomes a basis for change of the lower 4 bits by which corresponding values (base points) are maintained.

FIG. 13 is a table showing weights of fine segments. In this table, fine segments are generated by combination of segments selectable by LSB and have one of weights 0, 1 and 2, which may actually correspond to zero, one and two switches, respectively, depending on coarse segments, that is, segments by MSB. (Of course, current sources may be configured with two kinds including a unit current source and a double unit current source and one segment may be configured to drive only one switch.)

The shown LSB segment weights are produced by combining the two arrangements shown in FIG. 10.

It can be seen from the shown table that the total combinable number of LSB segments required depending on coarse segments is nonlinearly reduced.

Figure 14:
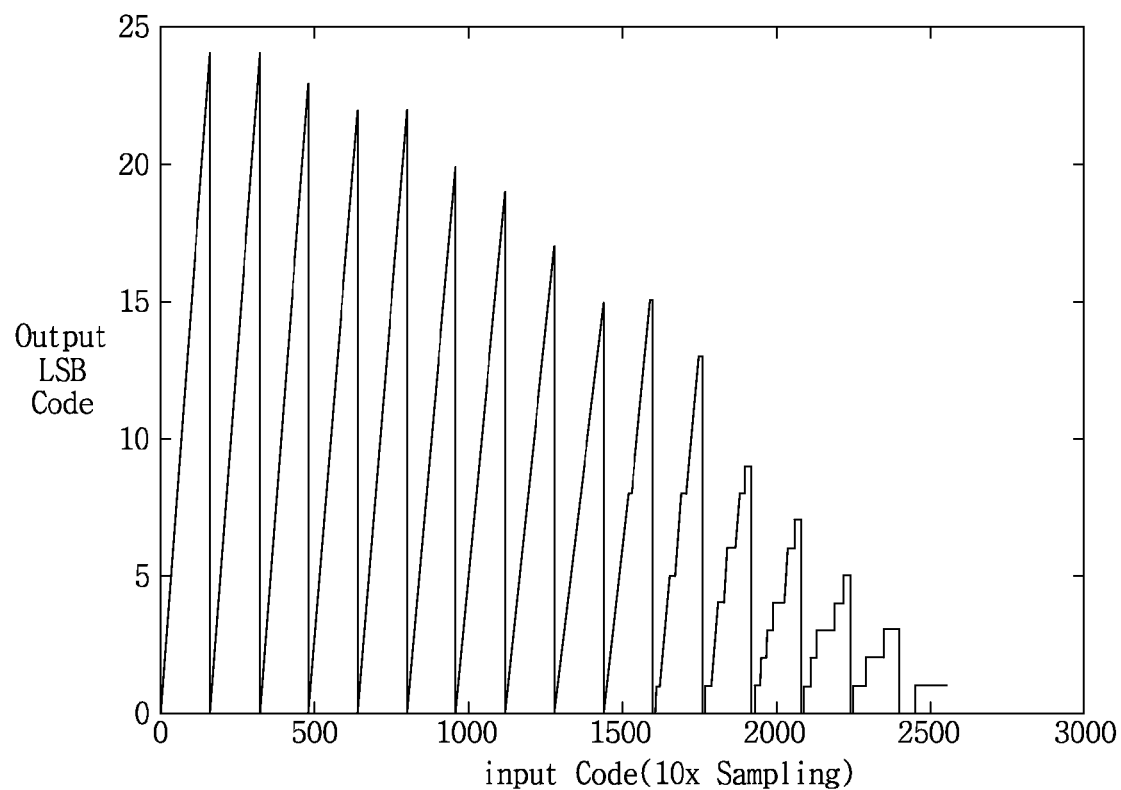
FIG. 14 is a view showing an output waveform of a variable DAC part according to an embodiment of the present invention.

FIG. 14 is a graph of the fine segments shown in FIG. 13. As shown, as a phase increases, a gradient applied with sine weighting in the unit of coarse segment has a pattern of increase and decrease, and the maximum value of the gradient in each unit region is nonlinearly reduced with nonlinear change of coarse segments as the phase increases.

That is, if a coarse segment is 0, the sum of LSB segments is 24, and it can be seen that it is possible to generate 15 fine segment currents increased in the form of sign weight by combining segments having weights of 1 and 2 depending on a selection of substantial 15 kinds of LSB segments, the currents are decreased with phase increase to reduce the deviation between coarse segments, and the number of selectable kinds is gradually reduced.

Figure 15:
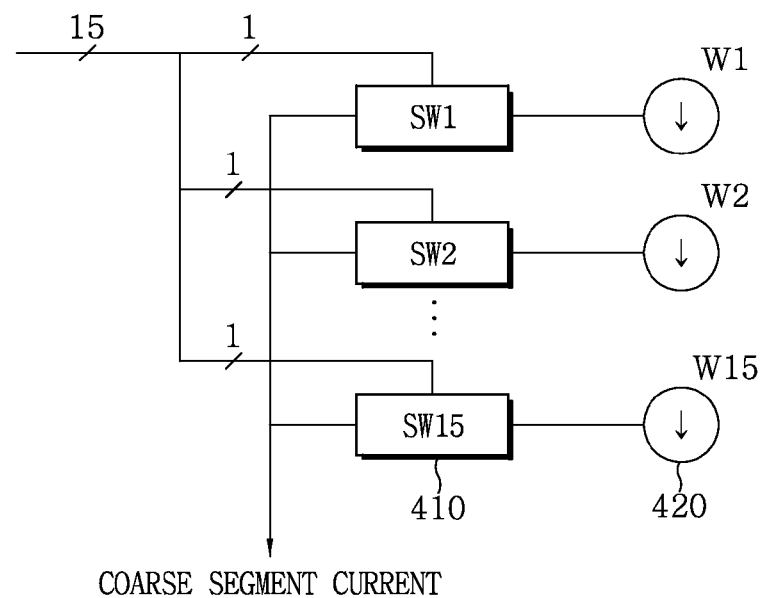
FIG. 15 is a view showing a configuration of a coarse nonlinear DAC according to an embodiment of the present invention.

FIG. 15 shows a configuration of the coarse nonlinear DAC 360 of FIG. 5. As shown, the substantial 15 bit output of the first thermometer decoder 310 is connected to each switch 410 which is then connected to each of different sign-weighted current sources 410. That is, the coarse nonlinear DAC 360 may be constituted by only 15 switches and 15 nonlinear current sources.

Figure 16:
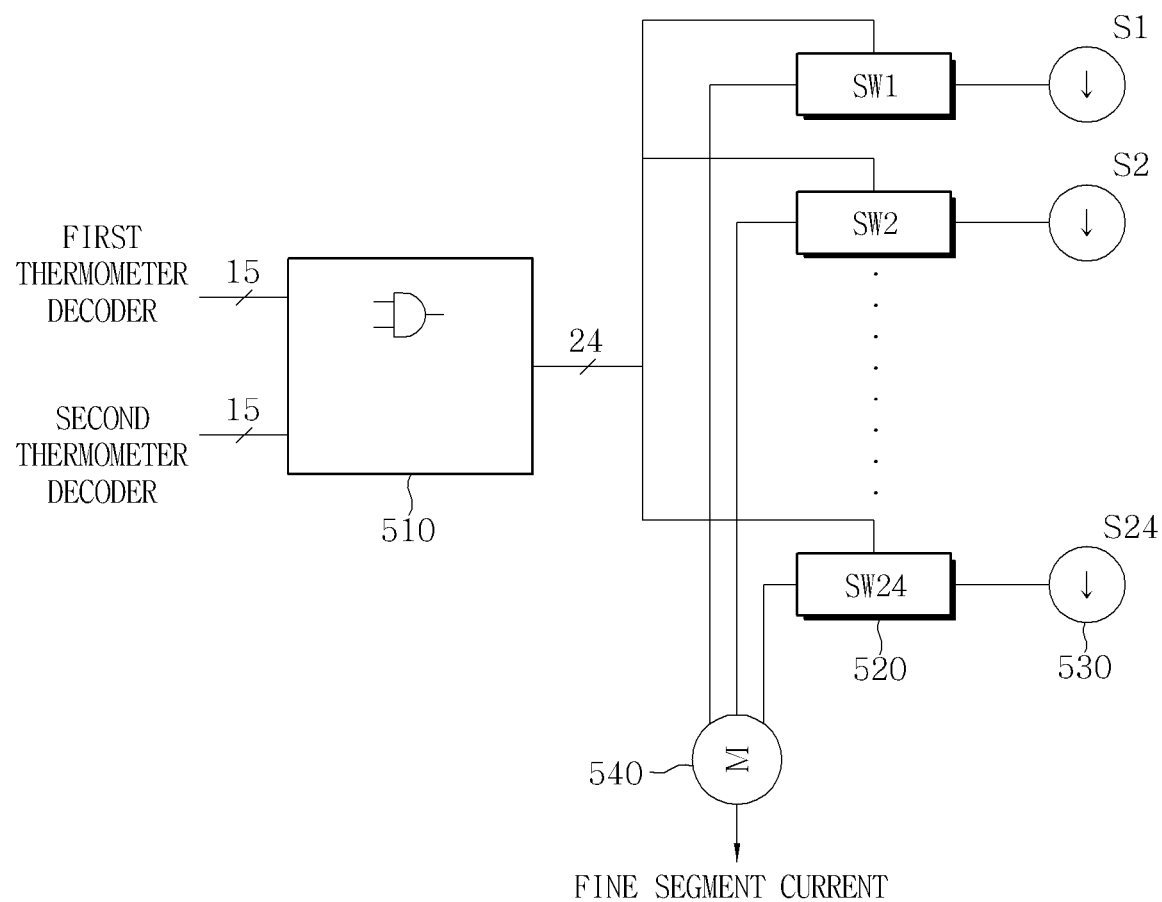
FIG. 16 is a view showing a configuration of a variable fine DAC according to an embodiment of the present invention.

FIG. 16 shows an example corresponding to the variable fine DAC 370 and logic part 330 of FIG. 5. As shown, the configuration of FIG. 16 includes 24 switches 520 to which 24 bit outputs of a logic part 510 constituted by an AND gate are connected, and unit current sources 530 connected respectively to the switches. Since a summing part 540 for summing outputs of the unit current sources depending on a combined driving of the shown switches 520 is not an actual element configuration, the shown variable fine DAC part is constituted by 24 switches and 24 unit current sources with the same unit weight.

In the end, the configuration of generating the ¼ sine wave amplitude of DDFS according to the embodiment of the present invention includes only two thermometer decoders, one AND gate logic part, 15 variable current sources, 15 switches for turning on/off these variable current sources, 24 unit current sources, and 24 switches for turning on/off these unit current sources.

That is, it is possible to provide a high quality output approximate to a sine wave at a high speed through an adaptive operation without a complicated configuration having a large implementation area, such as an operator, a controller, a unit gradient generator, a base decoder and so on. In case of the illustrated DDFS having the 9 bit resolution, it is possible to extremely reduce a size and power consumption through simplification of an internal configuration as well as providing its equivalent or further improved output quality as compared to other existing DDFSs having a 9 bit resolution which have to employ a complicated operator and controller. In addition, since the DDFS of the present invention can be operated at a higher speed, its application range can be extended.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A direct digital frequency synthesizer using a variable sine wave-weighted digital to analog converter (DAC), comprising:
   a phase accumulator that accumulates control words to provide phase information;
   a nonlinear DAC part that determines base points using upper first data of the phase information of the phase accumulator and generates a corresponding coarse segment current; and
   a variable DAC part that varies weights of segments selected according to lower second data of the phase information of the phase accumulator on the basis of the base points determined in the nonlinear DAC part and generates a fine segment current combined to the determined base points such that the fine segment current is sine-weighted.

2. The direct digital frequency synthesizer according to claim 1, wherein the nonlinear DAC part and the variable DAC part include a plurality of complementors that extends a phase for amplitude of a ¼ sine wave region, which is obtained using the first and second data, using the most significant third data of the phase information of the phase accumulator.

3. The direct digital frequency synthesizer according to claim 2, further comprising a one bit DAC part that selectively shifts the amplitude obtained from the first and second data using one bit data of the third data.

4. The direct digital frequency synthesizer according to claim 1, wherein the nonlinear DAC part includes:
   a first thermometer decoder that thermometer-decodes the first data;
   a plurality of first switches operated one by one depending on an output of the first thermometer decoder; and
   sine-weighted nonlinear current sources connected respectively to the plurality of first switches.

5. The direct digital frequency synthesizer according to claim 4, wherein the nonlinear DAC part includes:
   a second thermometer decoder that thermometer-decodes the second data;
   a logic part that combines a plurality of segments depending on an output of the second thermometer decoder while varying weights of the segments on the basis of the output of the first thermometer decoder;
   a plurality of second switches operated corresponding to the segment combination according to an output of the logic part; and current sources connected respectively to the plurality of second switches.

6. The direct digital frequency synthesizer according to claim 5, wherein the logic part includes an AND gate.

7. The direct digital frequency synthesizer according to claim 6, wherein the logic part is sine-weighted with an adaptive resolution by varying the number of unit segments, which will be simultaneously used on the basis of the output of the first thermometer decoder, of unit segments which are arranged on the basis of two times the number of outputs of the second thermometer decoder and selectively provide unit current sources, respectively.

8. The direct digital frequency synthesizer according to claim 7, wherein the number of unit segments arranged on the basis of two times the number of outputs of the second thermometer decoder can be reduced by changing combination of the unit segments.

9. The direct digital frequency synthesizer according to claim 1, wherein the variable DAC part includes:
 a second thermometer decoder that thermometer-decodes the second data;
 second switches which are operable in combination and more than the number of outputs of the second thermometer decoder, and unit current sources connected respectively to the second switches; and
 a logic part that outputs a sine-weighted fine voltage by varying the number of second switches combinable according to the outputs of the second thermometer decoder on the basis of the output of the first thermometer decoder.

10. The direct digital frequency synthesizer according to claim 9, wherein operations of switch combinations according to the outputs of the second thermometer decoder are equal to each other, and the number of second switches corresponding to units of combinations according to the output of the first thermometer decoder can be selectively varied.

11. A direct digital frequency synthesizer using a variable sine wave-weighted digital to analog converter (DAC), comprising:
 a phase accumulator that accumulates control words to provide phase information;
 a plurality of complementors that, based on the most significant two bit data of the phase information of the phase accumulator, extends a phase by performing a selective complementary operation for the remaining data of the phase information of the phase accumulator;
 a nonlinear DAC part that thermometer-decodes next upper first data of the phase information of the phase accumulator and generates a coarse segment current by operating one of switches, to which nonlinear current sources are respectively connected, according to a thermometer-decoding output; and
 a variable DAC part that performs an AND operation for a thermometer-decoding output of lower second data of the phase information of the phase accumulator and the thermometer-decoding output of the first data and generates a sine-weighted fine segment current by varying and combining the number of combinable switches used, which are connected respectively to unit current sources, according to the thermometer-decoding output of the first data.

12. The direct digital frequency synthesizer according to claim 11, wherein the variable DAC part includes combinable basic switches of the same number as thermometer-decoding outputs of the second data, a plurality of additional selectable switches, and a logic part that interlocks the additional selectable switches with the basic switches according to the thermometer-decoding output of the first data.

13. The direct digital frequency synthesizer according to claim 12, wherein the combinable number of the basic switches according to the thermometer-decoding outputs of the second data is equal to the number of the thermometer-decoding outputs, and, according to the thermometer-decoding output of the first data, the basic switches for the combination are varied such that the basic switches are operated or not, or two switches are operated by interlocking an additional switch with a basic switch.

14. A method of synthesizing a direct digital frequency using a variable sine wave-weighted digital to analog converter (DAC), comprising:
 a data dividing step of dividing an output of a phase accumulator into first data for designating base points and second data for obtaining an additional value approximate to a sine wave;
 a coarse current generating step of thermometer-decoding the first data and operating switches connected respectively to sine-weighted nonlinear current sources according an thermometer-decoding output;
 a fine current generating step of performing a logical operation for an thermometer-decoding output of the second data and the thermometer-decoding output of the first data and generating a fine current by combining segments variably weighted according to the thermometer-decoding output of the first data; and
 a summing step of summing the generated coarse current and fine current to generate a current corresponding to a sine wave amplitude.

15. The method according to claim 14, wherein the fine current generating step further includes a step of varying the number of the switches corresponding to the segments according to the thermometer-decoding output of the first data and a step of generating a sine-weighted nonlinear fine current by a preset segment combination according to the thermometer-decoding output of the second data.

16. The method according to claim 15, wherein the switches are respectively connected to unit current sources and the number of variable switches is 0 to 2.

17. The method according to claim 15, wherein the maximum number of the switches simultaneously corresponding to the segments is larger than the number of thermometer-decoding outputs of the second data and smaller than two times the number of thermometer-decoding outputs of the second data.

18. The method according to claim 14, wherein the data dividing step further includes a step of generating third data for extension of a generated amplitude phase, the coarse current generating step and the fine current generating step further include a step of performing a complementary operation for process-targeted data at a plurality of positions based on the third data, and the summing step further includes a step of shifting an output current corresponding to the sine wave amplitude based on the third data.

* * * * *